United States Patent [19]

Kobashi et al.

[11] Patent Number: 4,725,646
[45] Date of Patent: Feb. 16, 1988

[54] METHOD OF PRODUCING HARD POLYVINYL ALCOHOL GEL

[75] Inventors: Toshiyuki Kobashi; Hideo Naka; Jinya Takeuchi, all of Okayama, Japan

[73] Assignee: Japan Exlan Company, Limited, Osaka, Japan

[21] Appl. No.: 878,362

[22] Filed: Jun. 24, 1986

[30] Foreign Application Priority Data

Jul. 8, 1985 [JP] Japan .................... 60-151132

[51] Int. Cl.$^4$ .................... C08F 8/00; C08F 8/12; C08F 16/06
[52] U.S. Cl. .................... 525/61; 525/330.6
[58] Field of Search .................... 526/330, 329.6, 266, 526/268, 333, 331; 525/330.6, 61

[56] References Cited

U.S. PATENT DOCUMENTS 2,462,817  2/1949  Smith .................... 526/333
3,925,327  12/1975  Mitsushima et al. .................... 526/330
3,956,244  5/1976  Carpenter .................... 526/330
3,972,865  8/1976  McClair et al. .................... 525/330.6

FOREIGN PATENT DOCUMENTS 52-138077  11/1977  Japan .
53-26830   3/1978   Japan .

OTHER PUBLICATIONS

Chem. Abstracts vol. 89, enty 181322n, Aug. 78.

Primary Examiner—Joseph L. Schofer
Assistant Examiner—Peter F. Kulkosky
Attorney, Agent, or Firm—Wenderoth, Lind & Ponack

[57] ABSTRACT

Hard polyvinyl alcohol gel is produced by copolymerizing a carboxylic acid vinyl ester monomer with a particular cross-linking agent and then saponifying the copolymer. This hard polyvinyl alcohol gel has excellent mechanical strength and separation ability and has no problem in copolymerizability and polymerization speed. Moreover, it shows no change in cross-linked structure before and after saponification.

8 Claims, 2 Drawing Figures

METHOD OF PRODUCING HARD POLYVINYL ALCOHOL GEL

BACKGROUND OF THE INVENTION (a) Field of the Invention

This invention relates to a method of producing a gel for use in liquid chromatography, and more particularly to a method of producing hard polyvinyl alcohol (hereinafter referred to as PVA) gel characterized by copolymerizing a carboxylic acid vinyl ester monomer with a cross-linking agent having a particular structure and then saponifying the copolymer.

(b) Description of the Prior Art

In recent years, liquid chromatography is not only used as an analytical means but also it is developing its application as an industrial separation means in many fields such as food industry, pharmaceutical industry, synthesis and purification of intermediate products in chemical industry, inorganic chemical industry, textile industry, etc. As gels for such use in liquid chromatography, cross-linked dextran polymer gel, cross-linked acrylamide polymer gel, agar, agarose gel, are known. However, these aqueous gels become very soft with an increase of water content and become weak in mechanical strength. Therefore, they are susceptible to fracture upon mechanical operations such as column packing, stirring, etc. They also have a defect that they are not strong enough against operations under pressure.

Among gels which do not suffer from weak gel strength peculiar to such conventional aqueous gels, PVA gels structurally strengthened in cross-linking power are known as aqueous gels for use in liquid chromatography. For example, W, Heitz et al report on a PVA gel obtained by saponifying polyvinyl acetate cross-linked with butane diol divinyl ether (Makromolekulare Chemie, 98, 42 (1966)). Furthermore, in Japanese Patent Kokai (Laid open) No. 138077/77, a PVA gel is produced by alkali-saponifying a copolymer of vinyl acetate and diethylene glycol dimethacrylate, etc. and further cross-linking the saponified copolymer with epichlorohydrin.

However, as is well known, cross-linking agents such as diethylene glycol dimethacrylate, butane diol divinyl ether, etc. are also hydrolyzed during saponification of polyvinyl acetate, and therefore it is very difficult to maintain sufficient cross-linkage of the initial stage. In consideration of this fact, Japanese Patent Kokai No. 138077/77 adopts the method of re-cross-linking with epichlorohydrin after the saponification of polyvinyl acetate.

On the other hand, Japanese Patent Publication No. 3482/83 and Japanese Patent Kokai No. 30945/82 propose a method of Producing a PVA gel which requires only cross-linking upon copolymerization but requires no additional cross-linking after saponification, wherein a cross-linking agent having a triazine ring structure is copolymerized. However, such a cross-linking agent has a defect of poor copolymerizability with vinyl carboxylate or slow polymerization speed, and there was a limit in obtaining an efficient cross-linked structure, so that it was impossible to obtain a hard PVA gel having a sufficient mechanical strength.

SUMMARY OF THE INVENTION

The object of this invention is to provide a method of producing a hard PVA gel which is excellent both in separation ability and in mechanical strength, exempt from defects of poor copolymerizability and slow polymerization speed, and shows no change in cross-linked structure before and after saponification.

The object of this invention is attained by copolymerizing a carboxylic acid vinyl ester monomer with a cross-linking agent selected from the following formulas (A) and (B), and thereafter saponifying the copolymer:

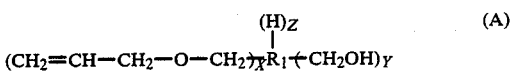

wherein $R_1$ is an alkane, the number of carbon atoms of which is m; m is an integer from 1 to 4; X is an integer from 2 to 4; Y is an integer from 0 to 4; Z is an integer satisfying the formula: $X+Y+Z=2m+2$,

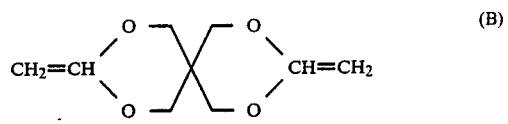

DETAILED DESCRIPTION OF THE INVENTION

The carboxylic acid vinyl ester monomers used in this invention are monomers composed singly of a carboxylic acid vinyl ester or a mixture of a carboxylic acid vinyl ester, the main component, and another ethylenically unsaturated compound. The term carboxylic acid vinyl esters means compounds having one or more polymerizable carboxylic acid vinyl ester groups, and they include, for example, aliphatic carboxylic acid vinyl esters such as vinyl acetate, vinyl propionate, vinyl butyrate, vinyl capronate, vinyl pivalate, divinyl adipate, etc. and aromatic carboxylic acid vinyl esters such as vinyl benzoate, divinyl phthalate, etc. Among others, vinyl acetate, vinyl propionate and vinyl butyrate are preferable because of the ease of polymerization and hydrolysis after polymerization. As the other ethylenically unsaturated compounds used as required may be mentioned olefins such as ethylene, propylene, etc.; vinyl halides and vinylidene halides such as vinyl chloride, vinyl bromide, vinylidene chloride, vinylidene bromide, etc.; vinyl ethers such as methyl vinyl ether, ethyl vinyl ether, etc.; vinyl cyanides such as acrylonitrile, methacrylonitrile, vinylidene cyanide, etc.

The cross-linking agents used in this invention must be selected from compounds shown by the previously mentioned formula (A) or (B). Two or more kinds of compounds may be used in combination. It is difficult to determine definitely the quantity of cross-linking agent to be used, because with the increase of the amount of cross-linking agent, harder gels are obtained, but the water content of the gel also varies. However, it is desirable to use generally from 0.1 to 50 weight %, preferably from 0.5 to 30 weight %, and for the best results from 1 to 30 weight %, based on the carboxylic acid vinyl ester monomer.

As examples of the cross-linking agent shown by the formula (A), there may be mentioned tetramethylol methane tetraallyl ether, tetramethylol methane triallyl ether, tetramethylol methane diallyl ether, trimethylol methane triallyl ether, trimethylol methane diallyl ether, dimethylol methane diallyl ether, trimethylol propane triallyl ether, trimethylol propane diallyl ether, dimethylol propane diallyl ether, tetramethylol propane triallyl ether, tetramethylol propane diallyl ether, etc.

As the polymerization means, there may be used usual solution polymerization, suspension polymerization or emulsion polymerization. Aqueous suspension polymerization using an oil-soluble radical polymerization initiator is most desirable because it produces a globular polymer of a desired particle diameter suitable as a gel for liquid chromatography. As the dispersing agents for such suspension polymerization, there may be used hydrophilic high molecular substances such as PVA, polyethylene oxide, polyvinyl pyrrolidone, methyl cellulose, hydroxyethyl cellulose, etc. However, particularly when a water-soluble polymer containing monomer units composed of an ethylenically unsaturated carboxylic acid or a salt thereof and monomer units composed of an ethylenically unsaturated sulfonic acid or a salt thereof is used singly or together with the above-mentioned hydrophilic high molecular substances, it is possible to advantageously produce the globular polymer.

As the ethylenically unsaturated carboxylic acids or salts thereof to be introduced into the water-soluble polymer, there may be mentioned unsaturated monovalent carboxylic acids and salts thereof such as acrylic acid, methacrylic acid, vinylacetic acid, crotonic acid, etc.; unsaturated polyvalent carboxylic acid and salts thereof such as maleic acid, fumaric acid, itaconic acid, aconitic acid, citraconic acid, mesaconic acid, etc. Particularly from the viewpoint of the ease of the formation of globular polymers, it is recommended to introduce monomer units composed of methacrylic acid or a salt thereof. As the ethylenically unsaturated sulfonic acids or salts thereof, there may be mentioned sulfonated unsaturated hydrocarbons and salts thereof such as sulfonated styrene, allylsulfonic acid, methallylsulfonic acid, etc.; acrylic acid or methacrylic acid sulfoalkyl esters and salts thereof such as methacrylic acid sulfoethyl ester, methacrylic acid sulfopropyl ester, etc.

Although it is difficult to determine definitely the quantity of such a water-soluble polymer to be used, it is desirable to use a quantity more than 5 weight % based on the monomer to be polymerized.

As the oil-soluble radical polymerization initiators, there may be mentioned the following azo compounds or organic peroxides: The azo compounds include for example 2,2'-azobisisobutyronitrile, 2,2'-azobis (2-methylvaleronitrile), 2,2'-azobis (2,4-dimethylbutyronitrile), 2,2'-azobis (2-methylcapronitrile), 2,2'-azobis (2,3,3-trimethylbutyronitrile), 2,2'-azobis (2,4,4-trimethylvaleronitrile), 2,2'-azobis (2,4-dimethylvaleronitrile), 2,2'-azobis (2,4-dimethyl-4-ethoxy-valeronitrile), 2,2'-azobis (2,4-dimethyl-4-n-butoxyvaleronitrile), etc. The organic peroxides include for example diacyl peroxides such as acetyl peroxide, propionyl peroxide, isobutyl peroxide, octanoyl peroxide, decanoyl peroxide, lauroyl peroxide, 3,5,5-trimethylhexanoyl peroxide, benzoyl peroxide, diisopropyl peroxydicarbonate, di-2-ethylhexyl peroxydicarbonate, etc.; peroxyesters such as t-butyl peroxyisobutylate, t-butyl peroxypivalate, t-butyl peroxyneodocanoate, t-butyl peroxylaurate, etc.

The polymerization conditions can be suitably determined within the temperature range of from 40° to 90° C., preferably from 45° to 70° C., and within the time range of from 0.5 to 15 hours.

In this invention, it is permissible to add to the monomer an organic solvent which is difficult to dissolve in water in order to control the quantity of pores in the copolymer obtained, the pore diameter or the pore diameter distribution.

Such an organic solvent means one having a solubility in water of less than 3 g/100 g water at 20° C. Examples of such organic solvents are benzene, toluene, xylene, heptane, octane, cyclohexane, butyl acetate, hexyl acetate, methyl isobutyl ketone, tetrahydrofuran, etc. It is difficult to determine definitely the quantity of such organic solvent to be used, because it is necessary to vary it according to the application field of the gel, the quantity of pores and the pore diameter required. However, it is desirable to set it generally within the range of monomer to organic solvent weight ratio of from 10/0 to 10/30, preferably from 10/1 to 10/20.

The thus-obtained cross-linked polymer is then saponified. The method of saponification is not particularly limited, but the polymer is saponified usually in an alkaline aqueous solution or in an alcoholic alkaline aqueous solution.

The saponification can proceed at room temperature, but it may be carried out at a temperature from 40° to 60° C., or may be carried out in an alcoholic aqueous medium under reflux.

The thus-obtained PVA gel, after having been washed sufficiently, can be used as gel for liquid chromatography. However, the gel may be further cross-linked with formaldehyde, epichlorohydrin, etc.

By the above-mentioned method, it is possible to produce in an industrially advantageous manner, a PVA gel having a particle diameter generally from 10 to 400$\mu$, preferably from 30 to 250$\mu$ and having a gel water content generally above 40%, preferably from 60 to 500%.

Since the above-mentioned method of producing the hard PVA gel of this invention uses cross-linking agents having excellent copolymerizability and no problem of breakage of the cross-linked structure upon saponification, there is no need of an individual cross-linking treatment after saponification. Therefore, this method has an advantage of simplifying the process, and at the same time it has the advantage of easily regulating the degree of cross-linkage of the produced polymer by only controlling the quantity of the cross-linking agent used upon polymerization.

By the advent of this invention, it has become possible to provide, in an industrial manner, a gel, of which the particle diameter, degree of cross-linkage, pore diameter, gel water content, etc. can be easily regulated. The handling of the gel, such in column packing, is easy because of its excellent mechanical strength, and the gel is suitable for operations under pressure, and has an excellent separation ability.

EXAMPLES OF THE PRACTICE OF THE INVENTION

In the following, this invention will be explained in more detail by Examples. However, this invention is not limited for its scope by the description of these Examples. In the Examples, parts and percentages are by weight unless otherwise indicated.

The gel water content was obtained as follows: Polymer particles which have sufficiently come into equilibrium with deionized water are placed in a centrifuge having a centrifugal effect of 2000 G to remove water adhering to the particle surface. The weight of the polymer particles after the removal of water ($W_1$) is measured. Subsequently, the polymer particles are dried, and the weight after drying ($W_2$) is measured. The gel water content was obtained by the following formula:

$$\text{Gel water content} = \frac{W_1 - W_2}{W_2} \times 100 \, (\%)$$

Example 1

Twenty (20) parts of a water-soluble polymer composed of methacrylic acid and sodium p-styrene sulfonate in the ratio of 70:30, and 2 parts of PVA (degree of polymerization: 1000; degree of saponification: 89%) were dissolved in 778 parts of water, and the solution was charged into a polymerization tank equipped with a paddle-type stirrer.

Then, in a prepared liquid composed of 190 parts of vinyl acetate, 10 parts of tetramethylol methane triallyl ether and 100 parts of ethyl acetate, 2 parts of 2,2'-azobis (2,4-dimethylvaleronitrile) was dissolved, and the solution was charged into the polymerization tank. The solution was subjected to aqueous suspension polymerization at 55° C. for 12 hours under a stirring condition of 300 r.p.m.

Subsequently, the polymer suspension was filtered, washed and dehydrated and thereafter the ethyl acetate remaining in the polymer particles was extracted and removed by methanol.

By saponifying the thus-obtained globular polymer in an alcoholic aqueous solution composed of 100 parts of an aqueous 2N caustic soda solution and 900 parts of methanol, a PVA gel (1) having a gel water content of 270% was produced.

This gel was insoluble not only in water of course but also methanol and other organic solvents. This fact confirmed that perfect cross-linkage was completed.

Figure 1:
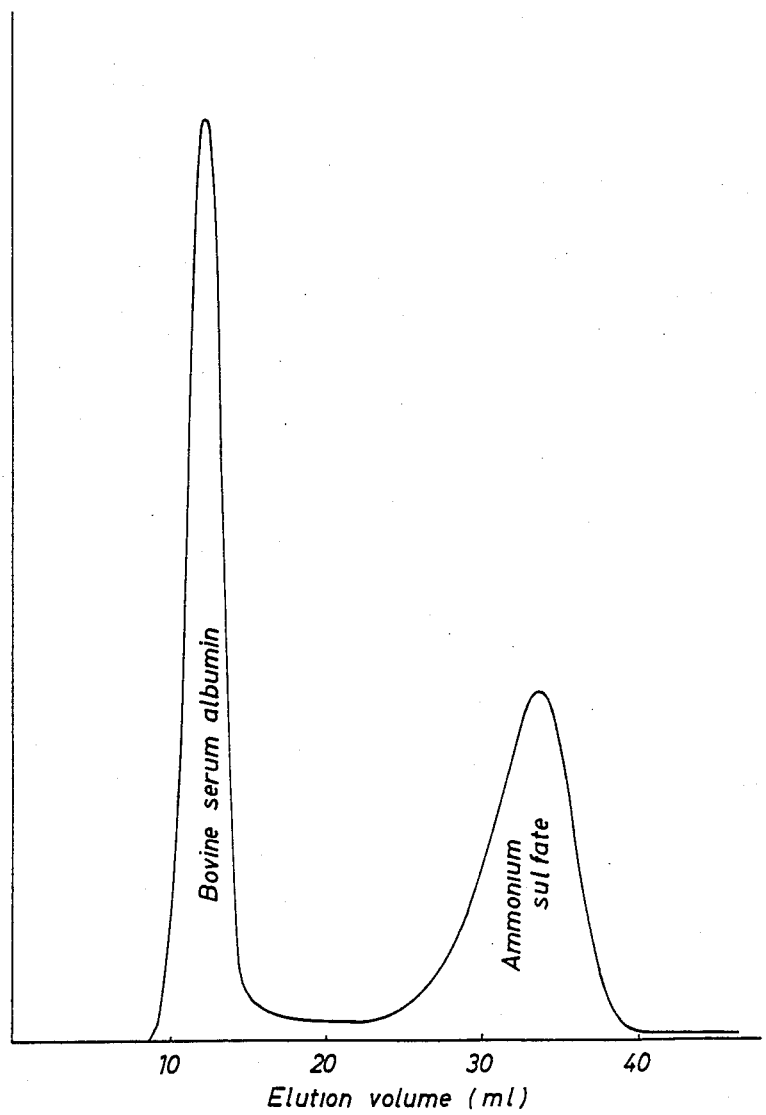
FIGS. 1 and 2 show elution curves obtained respectively from the following Examples 1 and 2.

Next, the gel particles were sieved out to obtain the intermediate fractions between 48 mesh and 150 mesh particles. The sieved gel particles were then packed in a glass column, 15 cm in inner diameter and 30 cm in height, and were evaluated for the ability as gel for liquid chromatography. As the test sample, 0.5 cc of an aqueous solution containing 5% bovine serum albumin and 2.5% ammonium sulfate was charged into the column. Using deionized water as the eluting agent, and operating at an elution speed of 60 cc/hr, the elution curve shown in FIG. 1 was obtained. This confirmed that the product of this invention has excellent separation ability.

Example 2

Figure 2:
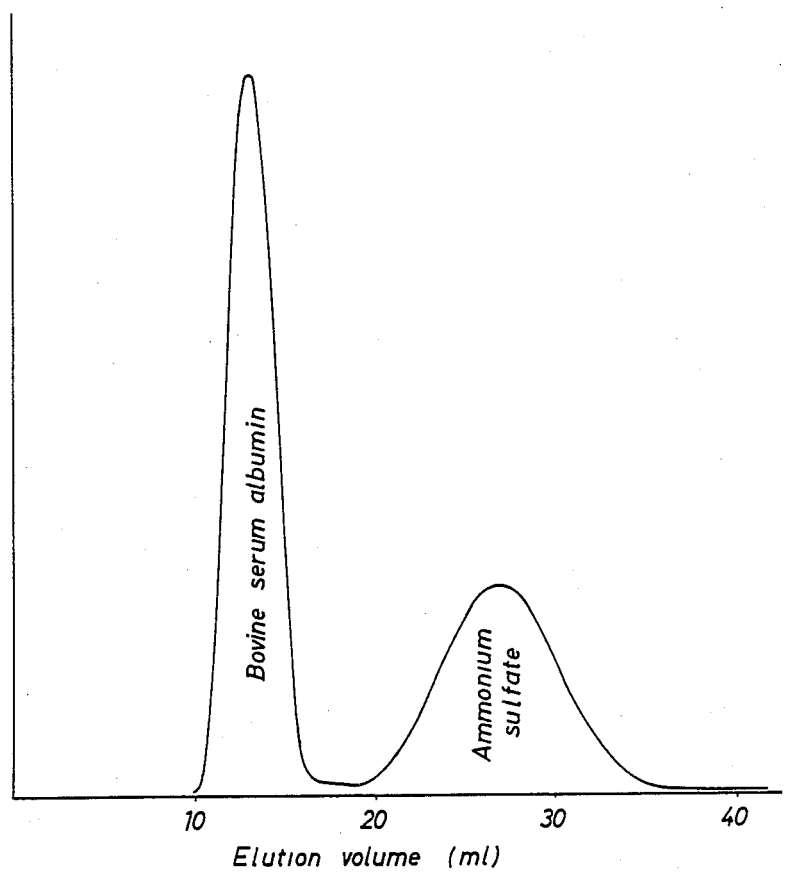

PVA gel (2) was produced in the same way as in Example 1 except that divinyl spirobimethadioxane was used instead of tetramethylol methane triallyl ether. The gel was measured for the separation ability. The gel water content was 240%. As apparent from the elution curve shown in FIG. 2, it is understood that the product of this invention has excellent separation ability.

What we claim is:

1. A method of producing a hard polyvinyl alcohol gel which comprises copolymerizing a carboxylic acid vinyl ester monomer with a cross-linking agent selected from the following formulae (A) and (B) by aqueous suspension polymerization using an oil-soluble radical polymerization initiator, and saponifying the resultant copolymer to produce a hard polyvinyl alcohol gel having a particle diameter of from 10 to 400μ and a gel water content above 40%:

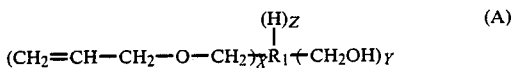

wherein $R_1$ is an alkane, the number of carbon atoms of which is m; m is an integer from 1 to 4; X is an integer from 2 to 4; Y is an integer from 0 to 4; and Z is an integer satisfying the formula: $X+Y+Z=2m+2$,

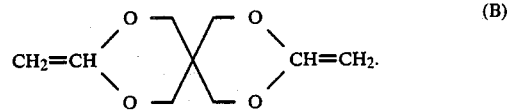

2. The method as claimed in claim 1 wherein the cross-linking agent is used in a quantity of from 0.1 to 50 weight % based on the carboxylic acid vinyl ester monomer.

3. The method as claimed in claim 1 wherein as the carboxylic acid vinyl ester monomer, vinyl acetate, vinyl propionate, or vinyl butyrate is used.

4. The method as claimed in claim 1 wherein a water-soluble polymer containing monomer units composed of an ethylenically unsaturated carboxylic acid or a salt thereof and monomer units composed of an ethylenically unsaturated sulfonic acid or a salt thereof is used as a dispersing agent.

5. The method as claimed in claim 4 wherein the water-soluble polymer is used in a quantity more than 5 weight % based on the monomer to be copolymerized.

6. The method as claimed in claim 1 wherein the copolymerization is conducted at a temperature of from 40° to 90° C. for 0.5 to 15 hours.

7. The method as claimed in claim 1 wherein the copolymerization is conducted in the presence of an organic solvent, of which the solubility in water is less than 3 g in 100 g water at 20° C.

8. The method as claimed in claim 1 wherein the saponification is conducted at a temperature of from 40° to 60° C.

* * * * *